(12) United States Patent
Kihara

(10) Patent No.: US 8,205,321 B2
(45) Date of Patent: Jun. 26, 2012

(54) METHOD OF ASSEMBLING A MAGNETO GENERATOR

(75) Inventor: Nobuhiro Kihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 701 days.

(21) Appl. No.: 12/357,432

(22) Filed: Jan. 22, 2009

(65) Prior Publication Data

US 2009/0134728 A1 May 28, 2009

Related U.S. Application Data

(63) Continuation of application No. 11/702,224, filed on Feb. 5, 2007, now Pat. No. 7,586,226.

(30) Foreign Application Priority Data

Aug. 9, 2006 (JP) ................................ 2006-216711

(51) Int. Cl.
*H02K 15/00* (2006.01)

(52) U.S. Cl. ................ 29/596; 29/598; 29/605; 29/606; 29/607

(58) Field of Classification Search ............... 29/596, 29/598, 605–607; 310/74, 153, 154.14, 154.17, 310/156.08, 156.43, 262, 267
See application file for complete search history.

(56) References Cited

U.S. PATENT DOCUMENTS

| 3,663,850 A | 5/1972 | Phelon |
| 4,877,986 A | 10/1989 | Shimizu |
| 5,345,133 A | 9/1994 | Satake |
| 6,339,271 B1 | 1/2002 | Noble et al. |
| 6,359,359 B1 * | 3/2002 | Miura et al. ............. 310/156.43 |
| 6,509,664 B2 | 1/2003 | Shah et al. |
| 2004/0263012 A1 | 12/2004 | Dommsch et al. |
| 2007/0096576 A1 | 5/2007 | Hashiba |

FOREIGN PATENT DOCUMENTS

| DE | 2212717 | 9/1973 |
| DE | 2835441 A1 | 2/1980 |
| DE | 3126649 C2 | 5/1982 |
| DE | 69609807 T2 | 3/2001 |
| DE | 10111951 A1 | 4/2002 |
| EP | 0205090 A2 | 12/1986 |
| EP | 1560318 A1 | 8/2005 |
| JP | 48-52804 | 9/1973 |
| JP | 1-168543 U | 11/1989 |
| JP | 2-107239 U | 8/1990 |
| JP | 2003-264970 A | 9/2003 |
| JP | 2003-348784 A | 12/2003 |
| JP | 2004-88855 A | 3/2004 |
| JP | 2004-349281 A | 12/2004 |
| JP | 2005-261046 A | 9/2005 |

OTHER PUBLICATIONS

German Office Action issued in corresponding German Application No. 10 2006 057 295.5-32, dated Apr. 8, 2011.

* cited by examiner

*Primary Examiner* — Thiem Phan
(74) *Attorney, Agent, or Firm* — Sughrue Mion, PLLC

(57) ABSTRACT

A method for assembling a magneto generator, the method including forming a plurality of permanent magnets, wherein at least one of the plurality of the permanent magnets is formed by dividing, in a radial direction, a magnet main body into a plurality of magnet pieces, mounting the formed plurality of the permanent magnets on an inner circumferential wall surface of a bowl-shaped flywheel, disposing a stator core having a plurality of teeth that project radially outward, inside said mounted plurality of the permanent magnets, and winding conductive wire onto each of the plurality of the teeth, thereby producing a generating coil.

3 Claims, 7 Drawing Sheets

GAP   G > g

RADIUS   R < r

METHOD OF ASSEMBLING A MAGNETO GENERATOR

CROSS REFERENCE TO RELATED APPLICATION

This is a divisional of application Ser. No. 11/702,224 filed Feb. 5, 2007, the disclosure of which is incorporated herein by reference in its entirety.

BACKGROUND OF THE INVENTION

1. Field of the Invention

The present invention relates to a magneto generator which generates electricity under the electromagnetic induction action of permanent magnets and magneto coils in accordance with the rotation of a flywheel.

2. Description of the Related Art

In the past, there has been known a magneto generator including a bowl-shaped flywheel that rotates about an axis of rotation, a plurality of arcuate permanent magnets that are fixedly secured to an inner peripheral wall surface of the flywheel in surface contact therewith, a stator core that is arranged at an inner side of the permanent magnets and has a plurality of teeth protruding to a radially outer side, and magneto coils that are formed of conductors wound around the teeth, respectively (see, for example, a first patent document: Japanese patent application laid-open No. 2003-348784 (FIG. 2)).

In the above-mentioned the magneto generator, cutting and abrasive machining are needed to produce the arcuate permanent magnets, so many man-hours of processing are required to produce the permanent magnets, and a large amount of machining margin of the permanent magnets to be cut or removed is also required, thus resulting in an accordingly increased amount of material of the permanent magnets to be used.

In addition, in recent years, magneto generators tend to increase their output power, so the amount of use of the permanent magnets (i.e., the amount of materials) used per generator is increased in accordance with the increasing frequency of the permanent magnets (magnetic poles) due to the multipolarization thereof and the increasing magnetic force due to the increased volume of the permanent magnets, as a result of which there arises a problem that the cost of the permanent magnets becomes high in cooperation with the increased man-hours of processing and the increased amount of margin materials to be cut or removed upon processing of the permanent magnets, thus resulting in an increased product cost.

SUMMARY OF THE INVENTION

Accordingly, the present invention is intended to obviate the problems as referred to above, and has for its object to obtain a magneto generator which is capable of reducing the man-hours of processing and the amount of use (i.e., the amount of material) of permanent magnets used per generator.

Bearing the above object in mind, a magneto generator according to the present invention includes: a bowl-shaped flywheel that rotates about an axis of rotation; a plurality of permanent magnets that are fixedly secured to an inner peripheral wall surface of the flywheel; a stator core that is arranged at an inner side of the permanent magnets and has a plurality of teeth protruding to a radially outer side; and magneto coils that are formed of conductors wound around the teeth, respectively. Each of the permanent magnets is composed of a plurality of magnet pieces that are formed by dividing a hexahedral magnet main body with a division surface extending in a radial direction.

According to a magneto generator of the present invention, it is possible to reduce the man-hours of processing and the amount of permanent magnets (the amount of material) used per generator.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
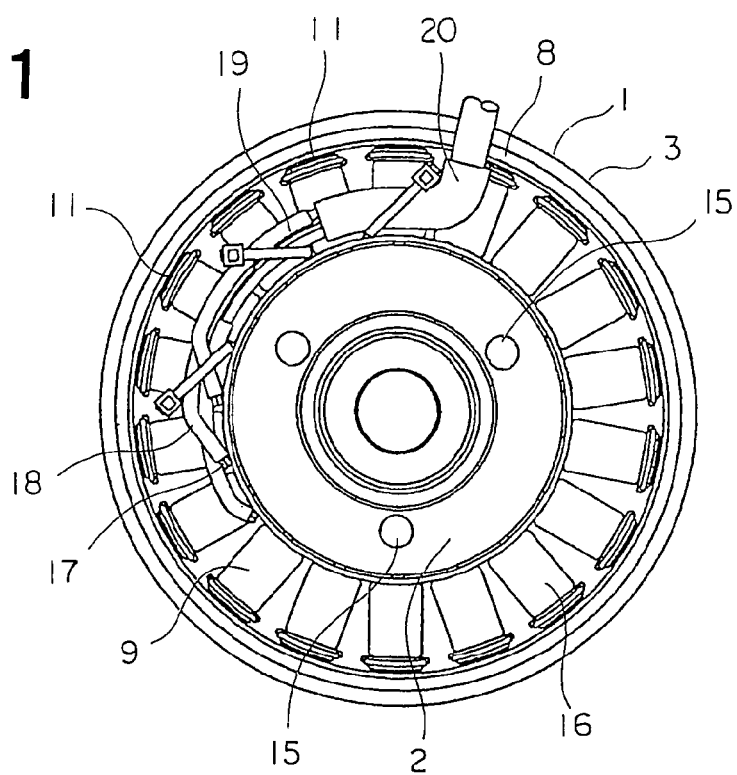
FIG. 1 is a front elevational view showing a magneto generator according to a first embodiment of the present invention.

Now, preferred embodiments of the present invention will be described in detail while referring to the accompanying drawings. Throughout respective figures, the same or corresponding members or parts are identified by the same reference numerals and characters.

Embodiment 1

Figure 2:
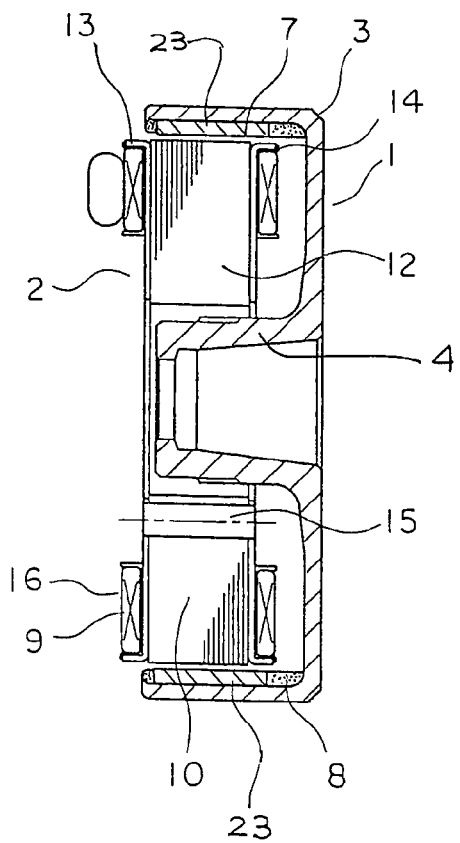
FIG. 2 is a cross sectional side view of the magneto generator of FIG. 1.
Figure 3:
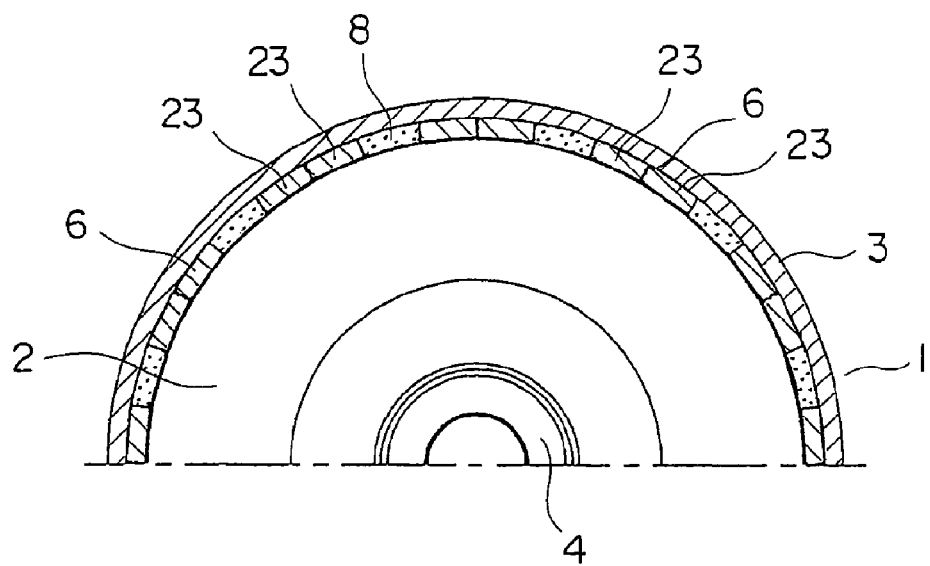
FIG. 3 is a partial cross sectional front view of a rotor of FIG. 1.
Figure 4:
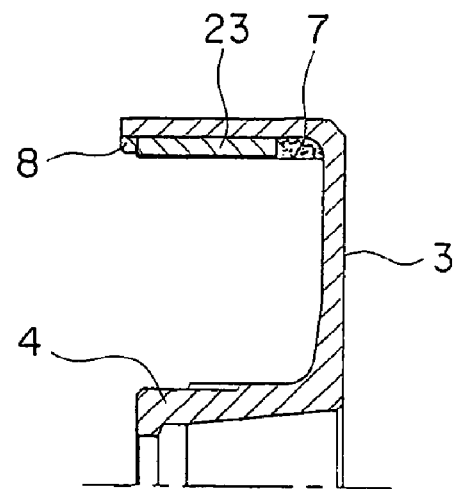
FIG. 4 is a cross sectional side view of the rotor of FIG. 3.

Referring to the drawings and first to FIG. 1, therein is shown a magneto generator according to a first embodiment of the present invention. FIG. 2 is a cross sectional side elevational view of the magneto generator of FIG. 1, and FIG. 3 is a partial cross sectional front view of a rotor 1 of FIG. 1. FIG. 4 is a cross sectional side elevational view of the rotor 1 of FIG. 3.

This magneto generator is provided with the rotor 1 connected with an internal combustion engine, and a stator 2 mounted on a bracket (not shown) arranged inside the rotor 1.

The rotor 1 includes a bowl-shaped flywheel 3 that is connected through a boss portion 4 with a rotation shaft (not shown) which is driven to rotate by an internal combustion engine, permanent magnets 6 that are arranged on an inner peripheral wall surface of the flywheel 3 at intervals in a circumferential direction, a cylindrical guard ring 7 that is in intimate contact with an inner side of each of the permanent magnets 6, and a molding material 8 that serves to fixedly secure the guard ring 7 and the individual permanent magnets 6 to the inner peripheral wall surface of the flywheel 3 while integrally connecting or binding the guard ring 7 and the individual permanent magnets 6 with one another.

The stator 2 has a hollow cylindrical stator core 10 and three-phase magneto coils 9. On the outer peripheral portion of the stator core 10, there are formed a plurality of teeth 11 that radially protrude in a radially outer direction at equal circumferential intervals.

The stator core 10 having the plurality of teeth 11 formed on its outer peripheral portion is composed of a laminated iron core 12 which is formed of a multitude of thin hollow magnetic steel plates in the form of cold rolled steel plates laminated one over another in the direction of the axis of rotation, and a first end plate 13 and a second end plate 14 superposed on the opposite side surfaces of the laminated core 12, respectively, in intimate contact therewith.

The first end plate 13 and the second end plate 14 of a hollow configuration made of cold rolled steel sheet, etc., have their outer peripheral portions bent toward the magneto coils 9 so as to hold the magneto coils 9.

Three through holes 15 are formed through the first and second end plates 13, 14 and the laminated iron core 12 in parallel to the axis of rotation. The laminated iron core 12 and the first and second end plates 13, 14 are integrated with one another by means of bolts (not shown) inserted through the through holes 15 and nuts (not shown) threaded on the bolts, respectively.

The magneto coils 9 are formed by winding conductors having their surfaces coated with enamel on the circumferential side surfaces of the teeth 11 of the stator core 10, and an insulating material 16 with an epoxy type powder coating is applied to the circumferential side surfaces of the teeth 11 around which the conductors are wound.

The magneto coils 9 have their lead wires 17 of the individual phases extended from the stator core 10 and covered with first protective tubes 18. The individual phase lead wires 17 are electrically connected with leads 19, respectively, for leading to electrical equipment (not shown) in the first protective tubes 18. The leads 19 extending in a tangential direction of the stator 2 are covered with a second protective tube 20.

Figure 5:
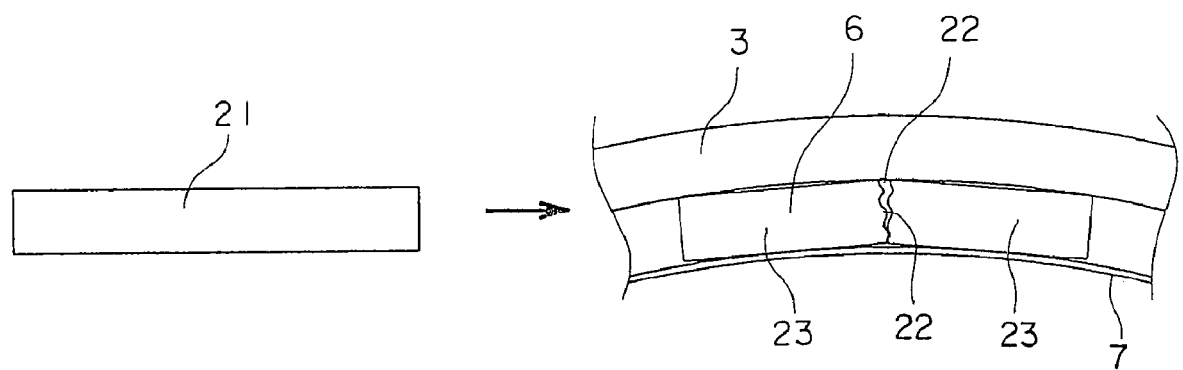
FIG. 5 is a view showing a procedure of forming a permanent magnet of FIG. 3.

Each of the permanent magnets 6 comprises a pair of magnet pieces 23 that are formed by dividing a magnet main body 21 of a hexahedral shape composed of a rare earth permanent magnet at its center with a division surface 22 extending in a diametral or radial direction, as shown in FIG. 5.

The individual permanent magnets 6 are arranged in such a manner that one type of permanent magnets 6, which have an N pole at a radially inner side and an S pole at a radially outer side, and another type of permanent magnets 6, which have an S pole at an radially inner side and an N pole at a radially outer side, are disposed in an alternate manner in a circumferential direction.

In this manner, the plurality of permanent magnets 6 are polarized in such a manner that adjoining permanent magnets have mutually opposite polarities, whereby in an inner space of the rotor 1, there is generated a magnetic field, the direction of which changes alternately.

In the magneto generator as constructed above, the flywheel 3 is caused to rotate in association with the rotation of the rotation shaft (not shown) which is driven to rotate by the internal combustion engine, whereby electric power is generated in the magneto coils 9 by means of an alternating field generated by the permanent magnets 6. An AC output thus generated is rectified by an unillustrated rectifier diode, and fed to a load such as a battery mounted on a vehicle.

Figure 6:
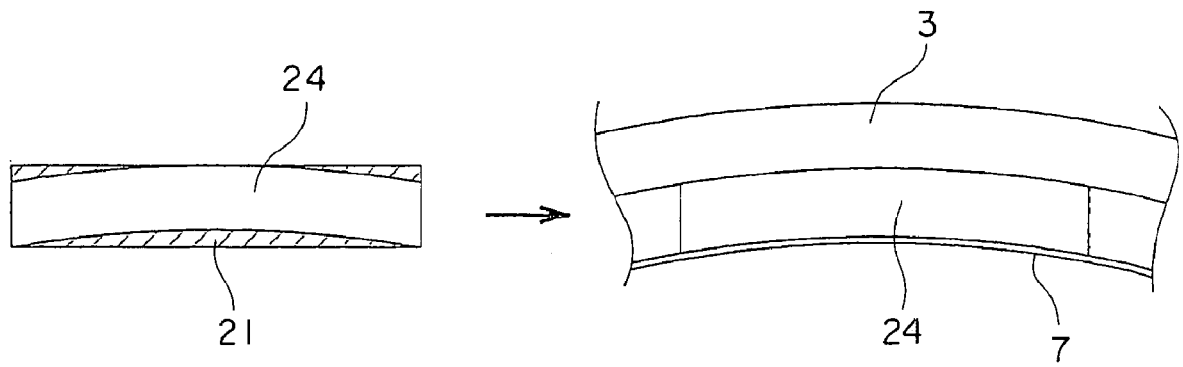
FIG. 6 is a view showing a procedure of forming a permanent magnet according to a conventional example.

According to the magneto generator of the above construction, each of the permanent magnets 6 comprises one pair of magnet pieces 23 that are formed by dividing the hexahedral magnet main body 21 composed of a rare earth permanent magnet at its center with the division surface 22 extending in the diametral or radial direction. Accordingly, each of the permanent magnets 6 is simpler in configuration or shape in comparison with the case where an arcuate permanent magnet 24 is produced by cutting a magnet main body 21 of a hexahedral shape, as shown in FIG. 6. As a result, the man-hours of processing therefor can be reduced, and the amount of margin of the material to be cut or removed upon machining can also be reduced, thus making it possible to decrease the amount of permanent magnets to be used.

Figure 7:
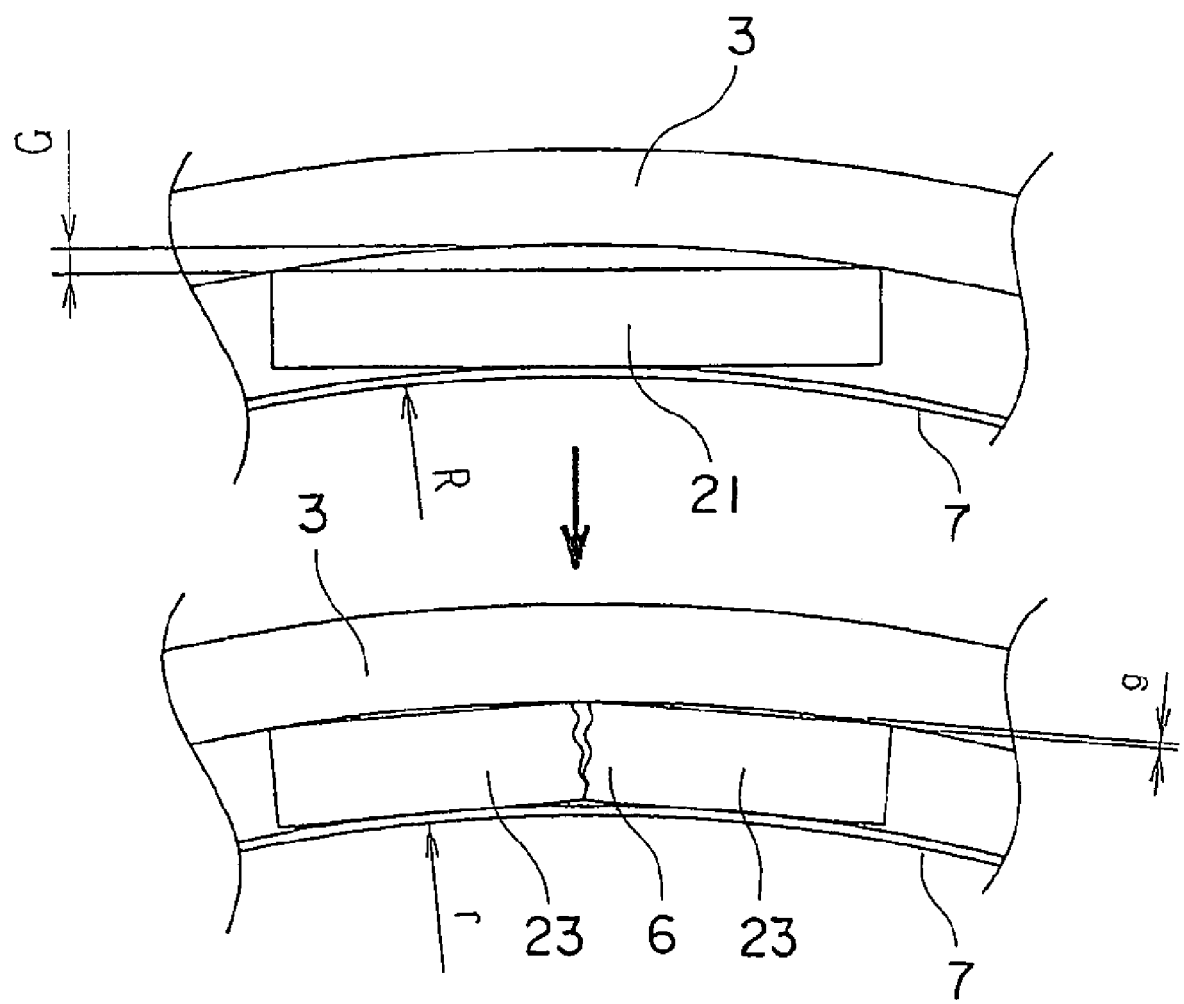
FIG. 7 is a view showing a clearance or gap between a flywheel and a permanent magnet according to the first embodiment of the present invention in comparison with that of the conventional example.

In addition, as shown in FIG. 7, a gap (g) between the flywheel 3 and a permanent magnet 6 can be greatly reduced as compared with a gap (G) between the flywheel 3 and the magnet main body 21 in the case of using the magnet main body 21 of the hexahedral shape without dividing it. Thus, a magnetic loss can be reduced.

Further, an inner radius (r) of the guard ring 7 when the permanent magnets 6 are used can be made larger as compared with an inner radius (R) of the guard ring 7 when the magnet main body 21 is used. As a result, a space for the stator 2 located at the inner side of the flywheel 3 (such as, for example, a space for the windings of the magneto coils 9) can be easily ensured.

Embodiment 2

Figure 8:
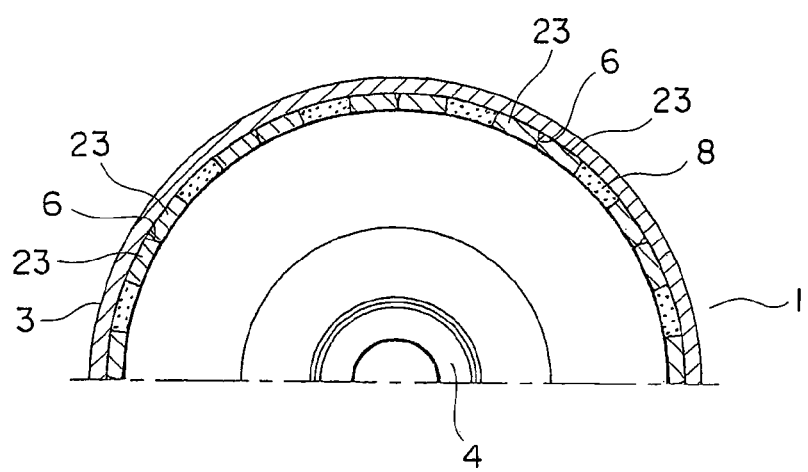
FIG. 8 is a front elevational view showing a magneto generator according to a second embodiment of the present invention.

FIG. 8 is a partial front elevational view that shows a rotor 1 of a magneto generator according to a second embodiment of the present invention.

Figure 9:
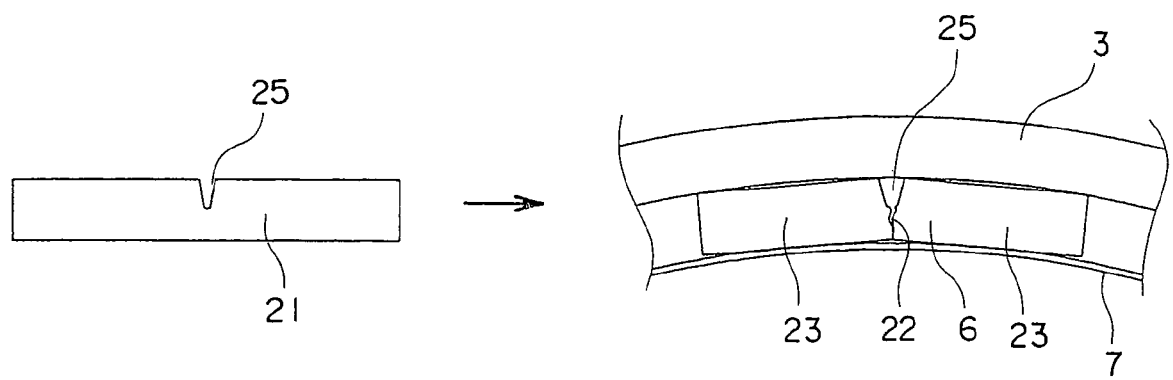
FIG. 9 is a view showing a procedure of forming a permanent magnet of FIG. 8.

In this second embodiment, as shown in FIG. 9, a slit 25 is formed in an upper side surface of a magnet main body 21. The construction of this second embodiment other than the above is similar to that of the first embodiment.

According to the magneto generator of this second embodiment, the slit 25 is formed in the magnet main body 21 beforehand, so there is obtained the following advantageous effect. That is, upon division of the magnet main body 21 into two pieces, the magnet main body 21 is divided into two with the slit 25 being set as a base point, and hence the magnet main body 21 can be divided at a predetermined location.

Embodiment 3

Figure 10:
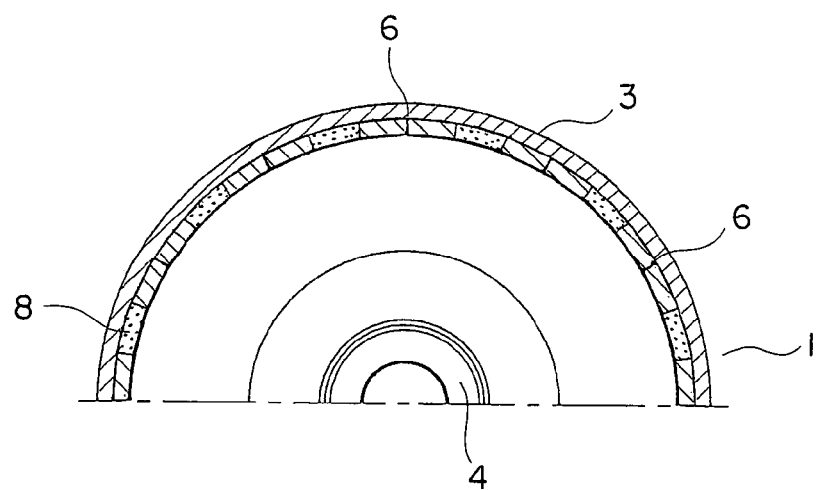
FIG. 10 is a side elevational view showing a magneto generator according to a third embodiment of the present invention.

FIG. 10 is a partial cross sectional front view showing a rotor 1 of a magneto generator according to a third embodiment of the present invention.

Figure 11:
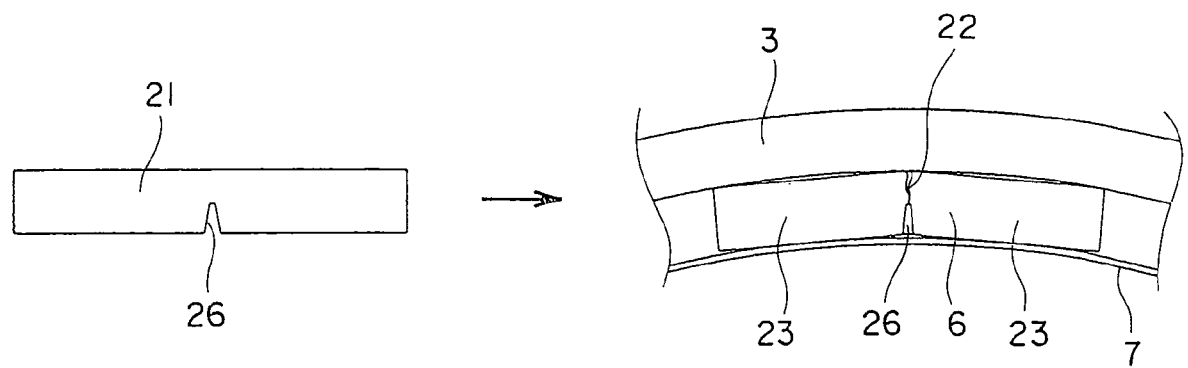
FIG. 11 is a view showing a procedure of forming a permanent magnet of FIG. 10.

In this third embodiment, a slit 26 is formed in a lower side surface of a magnet main body 21, as shown in FIG. 11. The construction of this third embodiment other than the above is similar to that of the first embodiment.

According to the magneto generator of this third embodiment, since the slit 26 is formed in the magnet main body 21 beforehand, there is obtained the following advantageous effect. That is, upon division of the magnet main body 21 into two pieces, the magnet main body 21 is divided into two with the slit 26 being set as a base point, so the magnet main body 21 can be divided at a predetermined location.

Here, note that a pair of slits may be formed in the opposite (i.e., upper and lower) surfaces of the magnet main body 21.

In addition, a slit or slits may be formed in a side surface or opposite side surfaces of the magnet main body 21, or a slit may be formed over the entire peripheral surfaces of the magnet main body 21.

Embodiment 4

Figure 12:
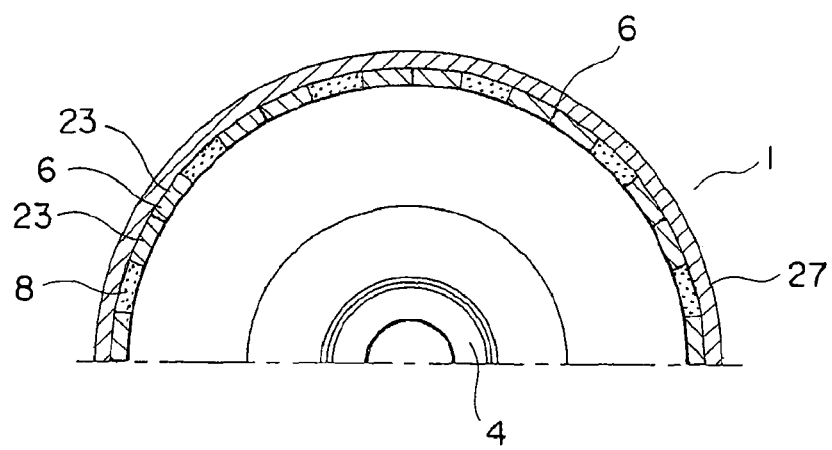
FIG. 12 is a partial cross sectional front view of a rotor of a magneto generator according to a fourth embodiment of the present invention.

FIG. 12 is a partial cross sectional front view of a rotor 1 of a magneto generator according to a fourth embodiment of the present invention.

In this fourth embodiment, a flywheel 27 has an inner peripheral wall surface of a polygonal shape. The construction of this fourth embodiment other than the above is similar to that of the first embodiment.

Figure 13:
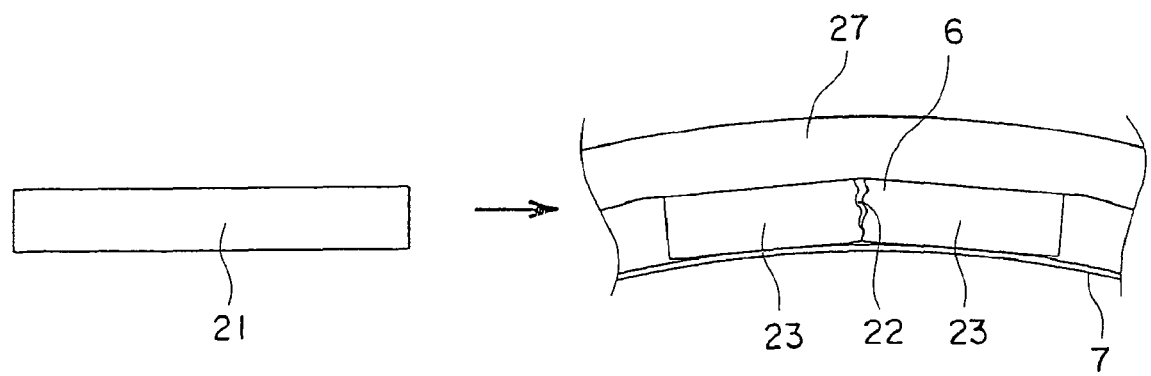
FIG. 13 is a view showing a procedure of forming a permanent magnet of FIG. 12.

According to this fourth embodiment, as shown in FIG. 13, a gap between a flywheel 27 and a magnet piece 23 can be made zero, so a magnetic loss can be reduced, thus making it possible to improve an output current of the magneto generator. In addition, such a zero gap has a function as a detent for the permanent magnets 6 at the time when the flywheel 27 rotates.

Although in the above-mentioned respective embodiments, each of the permanent magnets 6 is composed of a pair of magnet pieces 23 that are formed by dividing the magnet main body 21 into two pieces, it may of course be composed of three or more magnet pieces that are formed by dividing the magnet main body 21 into three or more pieces.

In addition, the permanent magnets 6 are not limited to rare earth permanent magnets but may be other types of permanent magnets such as for example ferrite magnets.

Moreover, although in the above-mentioned respective embodiments, the permanent magnets 6 and the guard ring 7 are fixedly secured or fastened to the flywheel 3 or 27 by means of the molding material 8, there may instead be used other fastening elements such as, for example, an element for fastening the permanent magnets 6 by caulking a caulking portion formed at an opening portion of the flywheel or an element for fastening the permanent magnets 6 by bonding them to the inner peripheral surface of the flywheel.

While the invention has been described in terms of preferred embodiments, those skilled in the art will recognize that the invention can be practiced with modifications within the spirit and scope of the appended claims.

What is claimed is:

1. A method for assembling a magneto generator, the method comprising:
    forming a plurality of permanent magnets, wherein at least one of the plurality of the permanent magnets is formed by dividing, in a radial direction, a magnet main body into a plurality of magnet pieces,
    forming, prior to the dividing the magnet main body in the radial direction, a slit in at least one of opposed surfaces of the magnet main body in the radial direction, and the dividing comprises dividing the magnet main body into the plurality of magnet pieces with the slit set as a base point;
    mounting the formed plurality of the permanent magnets on an inner circumferential wall surface of a bowl-shaped flywheel;
    disposing a stator core having a plurality of teeth that project radially outward, inside said mounted plurality of the permanent magnets, and
    winding conductive wire onto each of the plurality of the teeth, thereby producing a generating coil.

2. The method according to claim 1, wherein the plurality of the divided pieces of the magnet main body are at least partially separated from each other.

3. The method according to claim 1, wherein the formed plurality of the permanent magnets are separate from each other.

* * * * *